(Specimens.)

A. HAMPRECHT.
DECORATED GLASSWARE.

No. 337,324. Patented Mar. 2, 1886.

Witnesses
J. A. Burns
W. B. Corwin

Inventor
August Hamprecht
by his attys
Bakewell & Kerr

UNITED STATES PATENT OFFICE.

AUGUST HAMPRECHT, OF WELLSBURG, WEST VIRGINIA.

DECORATED GLASSWARE.

SPECIFICATION forming part of Letters Patent No. 337,324, dated March 2, 1886.

Application filed December 16, 1885. Serial No. 185,796. (Specimens.)

*To all whom it may concern:*

Be it known that I, AUGUST HAMPRECHT, of Wellsburg, in the county of Brooke and State of West Virginia, have invented a new and useful Improvement in Decorated Glassware; and I do hereby declare the following to be a full, clear, and exact description thereof.

My invention consists of an article of glassware decorated by any desired design or pattern made up partly of frosted groundwork and partly of fused or fixed colors. The effect is novel and beautiful. The base or outlines, together with such other lines and parts as are desired to give strength and character to the design or pattern, are made by grinding, and are of a translucent character, the article being made of clear glass. The body of the design or parts of the same is delineated in one or more colors by painting or otherwise, and the colors are fired or baked in. The result is a beautiful and unique decoration. It is applicable to any kind of glassware, and is especially beautiful on fine ware.

To enable others skilled in the art to make use of my invention, I will now describe it by reference to the accompanying drawings, in which—

Figure 1:
Figure 2:
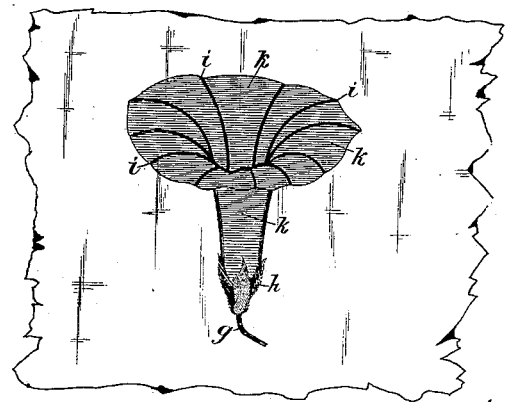

Figure 1 is a pitcher illustrating the process. Fig. 2 is a view of a piece of glass showing another pattern.

The design shown in Fig. 1 is that of a vine having leaves and a flower. The vine $a$, stipules $b$, the edges of the leaves $c$, and flower $d$, and the veins $e$ of the leaves, are all formed by grinding, and are translucent, having a frosted appearance, and the surface of the central portions, $f$, or any desired part of them, is colored.

Any desired number and arrangement of the colors may be adopted, that depending entirely on the character of the design and the taste of the decorator.

In Fig. 2 I show a piece of glass upon which is a morning-glory. Here the stem $g$, calix $h$, and veins $i$ are delineated by grinding, while the corolla or petals $k$ are delineated by colors or tints, whereby the delicate hues can be properly represented.

The article can be made by the following process: Any desired article of glassware is taken, and color is applied in spots at the proper points—for instance, for the leaves $c$ and flower $d$. This color may be of one or more tints, as may be desired. The proper surfaces being thus covered, the article is placed in a suitable furnace and the color or colors fixed by baking or burning. It is then taken to the cutting-shop and the edges of the colored spots ground to form the frosted edges of the leaves $c$ and flower $d$. The figures thus made have colored centers and ground outlines. The connecting-lines in Fig. 1, the vine $a$, stipules $b$, and veins $e$, necessary to complete the general design, are ground in. It is apparent that designs of a great variety can be produced in this way. The wide or body portions are made by first applying a spot of color, and then the outline of the figure is cut, as stated, removing any part of the colored surface that may extend to the lines of cut. Party-colored designs can be produced on glassware in this way with beautiful and striking effects. The application of all kinds of flowers, leaves, plants, fruits, insects, geometrical and other figures, faces, and emblems to glassware by this process is contemplated.

It will be noticed that the ground edges of the leaves $c$ and the center and edges of the flower $d$, as well as the calix $h$, are composed of a series of surfaces or plane figures $x$, having an imbricated appearance and a diagonal grain. This is accomplished by presenting the article to the wheel at an angle to the axis of the figure and overlapping the mark of the previous cut. This method is useful in representing scaly and other imbricated patterns. It gives a very handsome effect.

The coloring need not cover the entire surface of the clear glass in the bounds of the design, but may be put on portions only of the same.

What I claim as my invention, and desire to secure by Letters Patent, is—

1. A new article of manufacture consisting of a decorated glass article having a pattern the outline of which is delineated by ground frosted work and the middle portions by fixed colors, substantially as and for the purposes described.

2. A new article of manufacture consisting of a decorated glass article having a pattern the outline of which is delineated by ground imbricated surfaces and the middle portions by fixed colors, substantially as and for the purposes described.

In testimony whereof I have hereunto set my hand this 8th day of December, A. D. 1885.

AUGUST HAMPRECHT.

Witnesses:
SARAH E. McCORD,
G. W. McCORD.